Aug. 12, 1924.
A. M. OSLOCK
1,504,897
DRIVING MECHANISM FOR SPEED INDICATORS
Filed Nov. 23, 1922
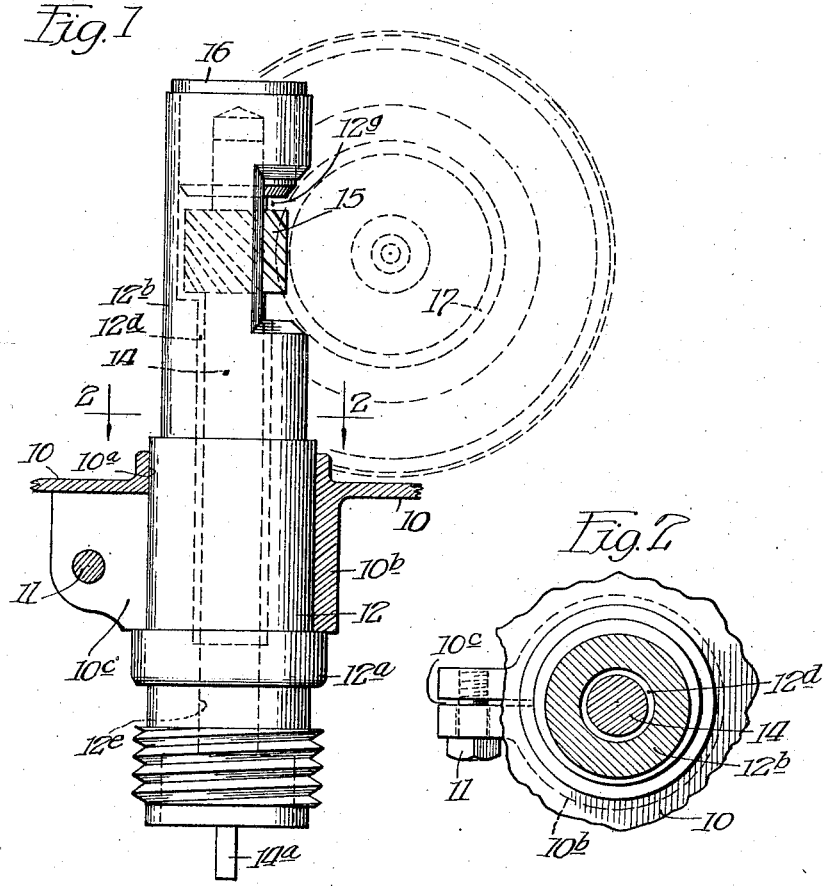
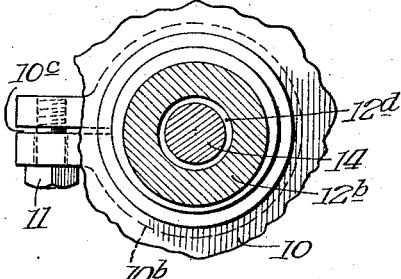
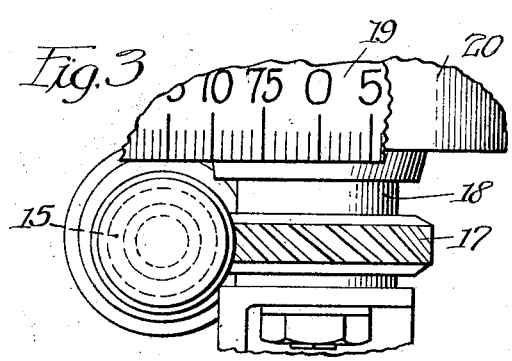
Inventor:
Albert M. Oslock,
By Sheridan, Jones & Sheridan
Attys.

Patented Aug. 12, 1924.

1,504,897

UNITED STATES PATENT OFFICE.

ALBERT M. OSLOCK, OF ELGIN, ILLINOIS, ASSIGNOR TO N. W. CHURCH, OF LOS ANGELES, CALIFORNIA.

DRIVING MECHANISM FOR SPEED INDICATORS.

Application filed November 23, 1922. Serial No. 602,734.

*To all whom it may concern:*

Be it known that I, ALBERT M. OSLOCK, a citizen of the United States, residing at Elgin, in the county of Kane and State of Illinois, have invented certain new and useful Improvements in Driving Mechanism for Speed Indicators, of which the following is a specification.

This invention relates to improvements in driving mechanisms for speed indicators and has for its object to provide a new and improved driving mechanism in which the pinion may be adjusted within certain limits with respect to the gear drives, this gear being attached to the rotating actuating element, a magnet in the specific embodiment shown in the accompanying drawing.

Increasing nicety of standards and specifications in the automobile trade have resulted in the demand for the elimination of all unnecessary noises, among others the noise of the driving gears and the speedometers, and my invention overcomes the noise ordinarily incident to the actuation of speedometers.

This and other objects are more fully described and disclosed in the following specification and shown in the accompanying drawing, in which—

Figure 1 is a plan view of the driving shaft and allied mechanism;

Fig. 2 is a horizontal section along the line 2—2 of Fig. 1; and

Fig. 3 is a rear elevation of the mechanism shown in Fig. 1.

Like numerals refer to like elements in the drawings.

10 indicates generally the frame or wall of the speedometer, having a circular aperture $10^a$ therethrough which is surrounded by the circular flange or collar $10^b$, having slot $10^c$ therein, through which and in threaded engagement with the sides of which, is the clamping screw 11. Through the opening $10^a$ is inserted a cylindrical bearing sleeve 12 having the shoulder $12^a$ abutting against the flange $10^b$, as shown in Fig. 1. Inwardly of the wall 10, the sleeve 12 is further reduced in diameter in the portion $12^b$ for convenience. The sleeve 12 is provided with eccentric bore $12^d$ and diminished in diameter, for example, at $12^e$. A portion of the sleeve 12 is cut away at $12^g$ for a purpose to be hereinafter described. Rotatably mounted in the sleeve 12 is the driving shaft 14 journaled in the reduced portion $12^e$ of the bore of the sleeve, provided with the engaging tongue $14^a$ for engagement with a flexible shaft, or the like, in well known manner. Carried upon the shaft 14 is the driving pinion 15 mounted in alinement with the cut-away opening $12^g$ of the sleeve. The shaft 14 is projected above the pinion 15 and is journaled at its end in the bearing plug 16, inserted in the open end of the sleeve 12, as shown in Fig. 1.

Driven by the pinion 15 is the gear 17 attached to the rotatable shaft 18, in turn carrying a magnet 20 for actuation of the indicating dial 19 in a well known manner.

As mentioned above, requirements as to elimination of noise have become so common, especially in connection with the high grade speed indicating devices and I have found that with the construction disclosed herein, the sleeve 12 may be rotated and made sufficient to bring the pitch of the pinion 15 and gear 17 into tangency, which, of course, is the ideal mesh, and by so doing, where the gears are properly cut, substantially all noise is eliminated and obviously the resultant actuation of the magnet is more efficient.

Another object resulting from this construction and the perfect mesh obtainable thereby, lies in the smooth driving of the magnet, which in the present day instruments, especially under variation in speed, receives intermittent impulses due to the back-flash or play between the gear teeth, which operate to impart a corresponding impulse to the indicating member, resulting in an annoying functioning of such member, and affecting the accuracy of its indication.

The play in the gears, of course, may be taken up by adjustment of the sleeve 12, as necessary, the screw 11 being operated to reclamp the sleeve in adjusted position.

I do not wish to be restricted to the embodiments of my invention shown and described, save as defined in the appended claims.

What I claim is—

1. In a mechanism of the class described, a clamping collar, a bearing sleeve rotatably mounted therein and having an eccentric bore, a driving shaft journaled at one end in said bore, means mounted in the sleeve in which the opposite end of the shaft is journaled, said sleeve having a lateral opening, a gear, and a pinion secured to the shaft and exposed through said opening and in mesh with said gear.

2. In a mechanism of the class described, a clamping collar, a bearing sleeve rotatably mounted therein and having an eccentric bore, a driving shaft journaled at one end in said bore, means mounted in the sleeve in which the opposite end of the shaft is journaled, said sleeve having a lateral opening, a gear, a pinion secured to the shaft and exposed through said opening and in mesh with said gear, together with means acting on the collar to hold the sleeve in adjusted position.

In testimony whereof, I have subscribed my name.

ALBERT M. OSLOCK.